(12) United States Patent
Inokuchi et al.

(10) Patent No.: US 12,472,798 B2
(45) Date of Patent: Nov. 18, 2025

(54) INFORMATION PROCESSING APPARATUS, INFORMATION PROCESSING METHOD, AND VEHICLE

(71) Applicant: TOYOTA JIDOSHA KABUSHIKI KAISHA, Aichi-ken (JP)

(72) Inventors: Takaaki Inokuchi, Nagoya (JP); Kunihiro Murakami, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 260 days.

(21) Appl. No.: 18/325,115

(22) Filed: May 30, 2023

(65) Prior Publication Data

US 2023/0391163 A1 Dec. 7, 2023

(30) Foreign Application Priority Data

Jun. 1, 2022 (JP) .................. 2022-089742

(51) Int. Cl.
*B60H 1/00* (2006.01)
*B60L 1/00* (2006.01)
*B60L 1/02* (2006.01)

(52) U.S. Cl.
CPC ..... *B60H 1/00657* (2013.01); *B60H 1/00385* (2013.01); *B60H 1/00792* (2013.01); *B60L 1/003* (2013.01); *B60L 1/02* (2013.01)

(58) Field of Classification Search
CPC ............ B60H 1/00657; B60H 1/00385; B60H 1/00792; B60H 1/00778; B60H 1/00642; B60H 1/004; B60H 1/0073; B60H 1/00807; B60H 1/00985; B60H 2001/3294; B60L 1/003; B60L 1/02; B60L 2240/34; B60L 2240/662; B60L 2240/70; B60L 2250/16; B60R 16/033
See application file for complete search history.

(56) References Cited

U.S. PATENT DOCUMENTS

| | | | | |
|---|---|---|---|---|
| 2004/0194479 A1* | 10/2004 | Umebayashi | ...... | B60H 1/00642 62/236 |
| 2012/0290161 A1* | 11/2012 | Takeda | ...... | B60L 1/00 903/930 |
| 2014/0330453 A1* | 11/2014 | Nakagawa | ...... | B60L 53/63 701/2 |
| 2018/0222282 A1 | 8/2018 | Tamane et al. | | |
| 2021/0309072 A1 | 10/2021 | Hadano et al. | | |

FOREIGN PATENT DOCUMENTS

| | | |
|---|---|---|
| DE | 102018101401 A1 | 8/2018 |
| JP | H08-149608 A | 6/1996 |
| JP | 4998209 B2 * | 8/2012 |
| JP | 2014-084060 A | 5/2014 |
| JP | 2021-160645 A | 10/2021 |

* cited by examiner

*Primary Examiner* — Rodney A Butler
(74) *Attorney, Agent, or Firm* — HAUPTMAN HAM, LLP (57) ABSTRACT

An information processing apparatus is configured to perform remote air conditioning by selecting either one of a first air conditioning mode, which is a mode in which remote air conditioning is performed using an engine of a vehicle, and a second air conditioning mode, which is a mode in which remote air conditioning is performed using electric power stored in a battery of the vehicle, wherein the apparatus is provided with a controller configured to select the second air conditioning mode to start air conditioning, in response to obtaining a request for performing remote air conditioning transmitted from a terminal of a user.

13 Claims, 7 Drawing Sheets

INFORMATION PROCESSING APPARATUS, INFORMATION PROCESSING METHOD, AND VEHICLE

CROSS REFERENCE TO THE RELATED APPLICATION

This application claims the benefit of Japanese Patent Application No. 2022-089742, filed on Jun. 1, 2022, which is hereby incorporated by reference herein in its entirety.

BACKGROUND

Technical Field

The present disclosure relates to an information processing apparatus, an information processing method, and a vehicle.

Description of the Related Art

There has been known a technique in which preheating of a vehicle interior via remote operation is performed in a first air conditioning mode using exhaust heat during the operation of an internal combustion engine or in a second air conditioning mode using an electrically operated heat pump (for example, Patent Literature 1). For example, when it is predicted that the temperature inside a vehicle can be raised to a target temperature in the second air conditioning mode before a scheduled travel start time, the preheating is performed in the second air conditioning mode. On the other hand, when it is predicted that the temperature inside the vehicle cannot be raised to the target temperature in the second air conditioning mode before the scheduled travel start time, the preheating of the vehicle interior is performed in the first air conditioning mode.

CITATION LIST

Patent Literature

Patent Literature 1: Japanese Patent Application Laid-Open Publication No. 2021-160645

SUMMARY

The object of the present disclosure is to shorten the time until air conditioning is executed.

One aspect of the present disclosure is directed to an information processing apparatus configured to perform remote air conditioning by selecting either one of a first air conditioning mode, which is a mode in which remote air conditioning is performed using an engine of a vehicle, and a second air conditioning mode, which is a mode in which remote air conditioning is performed using electric power stored in a battery of the vehicle, the information processing apparatus comprising:
 a controller configured to select the second air conditioning mode to start the air conditioning, in response to obtaining a request for performing remote air conditioning transmitted from a terminal of a user.

Another aspect of the present disclosure is directed to an information processing method configured to perform remote air conditioning by selecting either one of a first air conditioning mode, which is a mode in which remote air conditioning is performed using an engine of a vehicle, and a second air conditioning mode, which is a mode in which remote air conditioning is performed using electric power stored in a battery of the vehicle, wherein
 a computer is configured to select the second air conditioning mode to start the air conditioning, in response to obtaining a request for performing the remote air conditioning transmitted from a terminal of a user.

A further aspect of the present disclosure is directed to a vehicle comprising:
 an engine;
 a battery; and
 a controller configured to perform remote air conditioning by selecting either one of a first air conditioning mode, which is a mode in which remote air conditioning is performed using the engine, and a second air conditioning mode, which is a mode in which remote air conditioning is performed using electric power stored in the battery; wherein
 the controller is configured to select the second air conditioning mode to start the air conditioning, in response to obtaining a request for performing the remote air conditioning transmitted from a terminal of a user.

In addition, a still further aspect of the present disclosure is directed to a program for causing a computer to perform the above-described method, or a storage medium storing the program in a non-transitory manner.

According to the present disclosure, it is possible to shorten the time until air conditioning is executed.

DESCRIPTION OF THE EMBODIMENTS

An information processing apparatus, which is one aspect of the present disclosure, is configured to perform remote air conditioning by selecting either one of a first air conditioning mode, which is a mode in which remote air conditioning is performed using an engine of a vehicle, and a second air conditioning mode, which is a mode in which remote air conditioning is performed using electric power stored in a battery of the vehicle. The remote air conditioning is air conditioning performed via remote control by a user from the outside of the vehicle, and is performed by the user transmitting a request to perform air conditioning using a user terminal from the outside of the vehicle. The transmission destination of the request may be an information processing apparatus of the vehicle, or may be an external information processing apparatus that gives instructions to the vehicle. The first air conditioning mode is a mode in which air conditioning is performed using energy generated by operating the engine. In the first air conditioning mode, for example, air conditioning is performed by using cooling water whose temperature is raised by the heat generated from the engine, or air conditioning is performed by operating a compressor with use of a rotational force of an output shaft of the engine. On the other hand, the second air conditioning mode is a mode in which air conditioning is performed by, for example, operating a heat pump or operating a heater using the electric power stored in the battery.

Here, the heat available in the second air conditioning mode may be less than the heat available in the first air conditioning mode. If the second air conditioning mode is selected in such a case, it is difficult to sufficiently raise the temperature inside the vehicle. Therefore, it is conceivable to select the first air conditioning mode or the second air conditioning mode in accordance with, for example, the outside air temperature. However, it takes, for example, several seconds to detect the temperature and select an air conditioning mode. For example, in cases where information on the start of remote air conditioning is transmitted to the user terminal, the information cannot be transmitted to the user terminal for several seconds until the temperature is detected and an air conditioning mode is selected. Therefore, after making a request for remote air conditioning, the user has to wait until he or she knows that remote air conditioning has started. If there is such a waiting time, it will be inconvenient for the user.

Therefore, the controller selects the second air conditioning mode to start the air conditioning in response to obtaining the request for performing the remote air conditioning transmitted from the user terminal. That is, without determining which of the first air conditioning mode and the second air conditioning mode is to be selected, the second air conditioning mode is first selected to start air conditioning. Accordingly, it is possible to promptly transmit to the user terminal the information indicating that air conditioning has been started. Therefore, the waiting time of the user can be shortened.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible and appropriate.

First Embodiment

Figure 1:
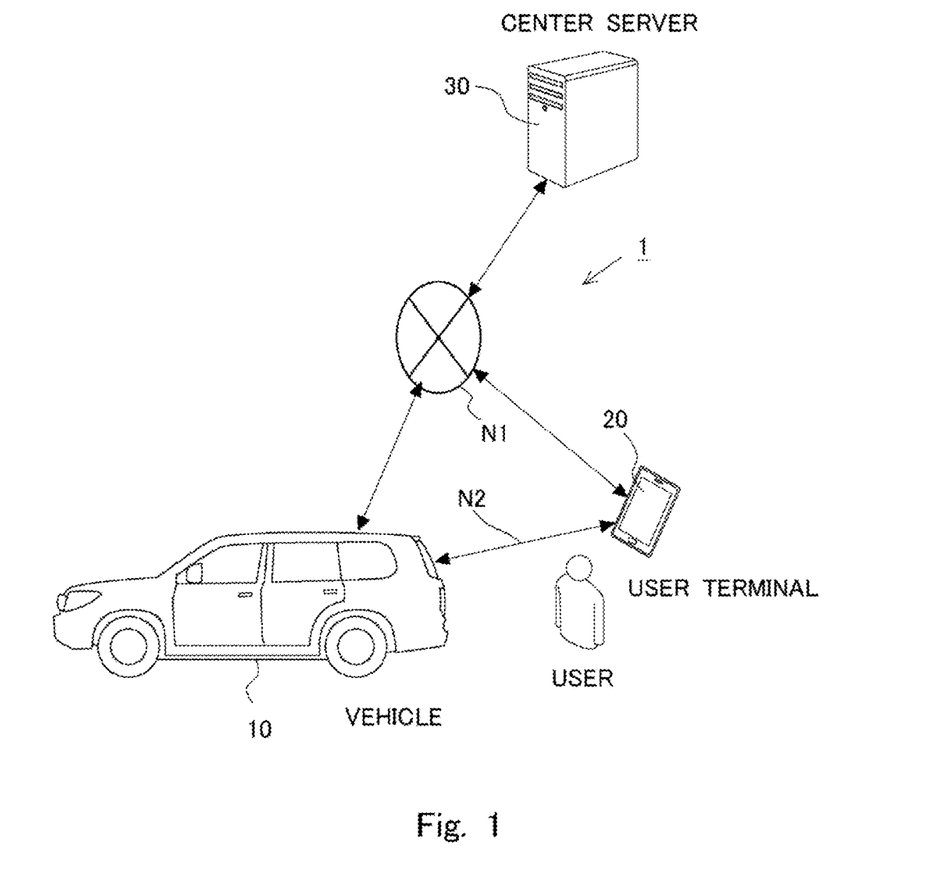
FIG. 1 is a view illustrating a schematic configuration of a system according to a first embodiment.

FIG. 1 is a view illustrating a schematic configuration of a system 1 according to a first embodiment. The system 1 is capable of remotely operating an air conditioner of a vehicle 10 according to a request sent from a user terminal 20 to a server 30.

In the example of FIG. 1, the system 1 includes the vehicle 10, the user terminal 20, and the server 30. The user terminal 20 is a portable terminal that is carried by a user. In addition, the vehicle 10 is associated with the user terminal 20. The vehicle 10, the user terminal 20 and the server 30 are connected to one another by means of a network N1. Here, note that the network N1 is, for example, a worldwide public communication network such as the Internet or the like, and a WAN (Wide Area Network) or other communication networks may be adopted. Also, the network N1 may include a telephone communication network such as a mobile phone network or the like, and/or a wireless communication network such as Wi-Fi (registered trademark) or the like. Further, the vehicle 10 may be connected to the user terminal 20 via a network N2 including short-range wireless communication or the like. FIG. 1 illustrates one vehicle 10 by way of example, but there can be a plurality of vehicles 10. In addition, there can also be a plurality of users and user terminals 20, depending on the number of vehicles 10.

Figure 2:
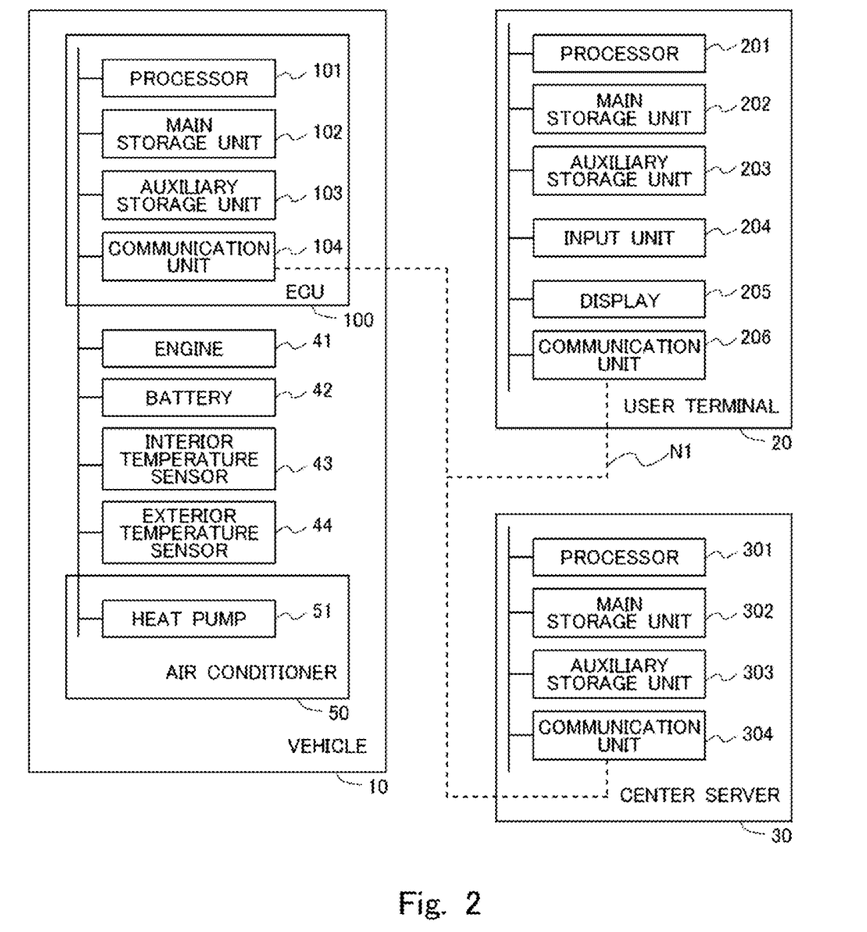
FIG. 2 is a block diagram schematically illustrating an example of a configuration of each of a vehicle, a user terminal and a center server, which together constitute the system according to the embodiment.

Hardware configurations and functional configurations of the vehicle the user terminal 20 and the server 30 will be described based on FIG. 2. FIG. 2 is a block diagram schematically illustrating an example of a configuration of each of the vehicle 10, the user terminal 20 and the server which together constitute the system 1 according to the present embodiment.

The server 30 has a configuration of a computer. The server 30 includes a processor 301, a main storage unit 302, an auxiliary storage unit 303, and a communication unit 304. These components are connected to one another by means of a bus.

The processor 301 is a CPU (Central Processing Unit), a DSP (Digital Signal Processor), or the like. The processor 301 controls the server 30 thereby to perform various information processing operations. The main storage unit 302 is a RAM (Random Access Memory), a ROM (Read Only Memory), or the like. The auxiliary storage unit 303 is an EPROM (Erasable Programmable ROM), a hard disk drive (HDD), a removable medium, or the like. The auxiliary storage unit 303 also stores an operating system (OS), various kinds of programs, various kinds of tables, and the like. The processor 301 loads the programs stored in the auxiliary storage unit 303 into a work area of the main storage unit 302 and executes the programs, so that each of the component units and the like is controlled through the execution of the programs. As a result, the server realizes functions that match predetermined purposes. The main storage unit 302 and the auxiliary storage unit 303 are computer-readable recording media. Here, note that the server 30 may be a single computer or a plurality of computers that cooperate with one another. In addition, the information stored in the auxiliary storage unit 303 may be stored in the main storage unit 302. Also, the information stored in the main storage unit 302 may be stored in the auxiliary storage unit 303.

The communication unit 304 is a means or unit that communicates with the vehicle 10 and the user terminal 20 via the network N1. The communication unit 304 is, for example, a LAN (Local Area Network) interface board, a wireless communication circuit for wireless communication, or the like. The LAN interface board or the wireless communication circuit is connected to the network N1.

Here, note that a series of processing executed by the sever 30 can be executed by hardware, but can also be executed by software.

Now, the user terminal 20 will be described. The user terminal 20 is a smart phone, a mobile phone, a tablet terminal, a personal information terminal, a wearable computer (such as a smart watch or the like), or a small computer such as a personal computer (PC). The user terminal 20 includes a processor 201, a main storage unit 202, an auxiliary storage unit 203, an input unit 204, a display 205, and a communication unit 206. These components are connected to one another by means of a bus. The processor 201, the main storage unit 202 and the auxiliary storage unit 203 are the same as the processor 301, the main storage unit 302 and the auxiliary storage unit 303 of the server 30, respectively, and hence, the description thereof will be omitted.

The input unit 204 is a means or unit that receives an input operation performed by the user, and is, for example, a touch panel, a mouse, a keyboard, a push button, or the like. The display 205 is a means or unit that presents information to the user, and is, for example, an LCD (Liquid Crystal Display), an EL (Electroluminescence) panel, or the like. The input unit 204 and the display 205 may be configured as a single touch panel display.

The communication unit 206 is a communication means or unit for connecting the user terminal 20 to the network N1 or the network N2. The communication unit 206 is, for example, a circuit for communicating with other devices (e.g., the vehicle 10, the server 30 or the like) via the network N1 or the network N2 by making use of a mobile communication service (e.g., a telephone communication network such as 5G (5th Generation), 4G (4th Generation), 3G (3rd Generation), or LTE (Long Term Evolution)) or a wireless communication network such as Wi-Fi (registered trademark), Bluetooth (registered trademark) or the like.

Now, the vehicle 10 will be described. The vehicle 10 is a plug-in hybrid electric vehicle (PHEV) in which an electric motor and an engine 41 are mounted and a battery 42 can be charged from an external power supply. The vehicle 10 includes an ECU 100 as an electronic control unit, the engine 41, the battery 42, an interior temperature sensor 43, an exterior temperature sensor 44 and an air conditioner 50. These components are mutually connected to each other by a CAN bus, which is a bus of the in-vehicle network. Note that the one ECU 100 is provided in the present embodiment, but instead of this, controllers corresponding to communication with the outside, control of the engine 41, and control of the air conditioner 50 may be provided, respectively.

The ECU 100 has a configuration of a computer. The ECU 100 is provided with a processor 101, a main storage unit 102, an auxiliary storage unit 103, and a communication unit 104. These components are mutually connected to one another by means of a bus. The processor 101, the main storage unit 102, the auxiliary storage unit 103, and the communication unit 104 are the same as the processor 201, the main storage unit 202, the auxiliary storage unit 203, and the communication unit 206 of the user terminal 20, respectively, and hence, the description thereof will be omitted. Note that the processor 101 is an example of a controller.

The engine 41 is, for example, a gasoline engine or a diesel engine, and the output thereof can be used for charging the battery 42 or for driving the vehicle 10. In addition, the cooling water of the engine 41 can be used as a heat source for heating. The battery 42 is a secondary battery that can be repeatedly charged and discharged. Further, the battery 42 can supply electric power to, for example, the electric motor that drives the vehicle 10, the engine 41, the air conditioner 50, and the ECU 100. For charging the battery 42, electric power generated when a generator is operated by the engine 41 may be used, or electric power supplied from an external power supply may be used.

The interior temperature sensor 43 is a sensor that detects the temperature inside the vehicle 10 (vehicle interior temperature). The exterior temperature sensor 44 is a sensor that detects a temperature outside the vehicle 10 (vehicle exterior temperature). The air conditioner is a device that adjusts the temperature inside the vehicle 10. The air conditioner 50 is provided with a heat pump 51. The heat pump 51 is a system that operates by receiving supply of electric power from the battery 42, collects heat from the atmosphere, and uses it for heating. Note that in the present embodiment, heating may be performed by an electric heater, instead of the heat pump 51.

Figure 3:
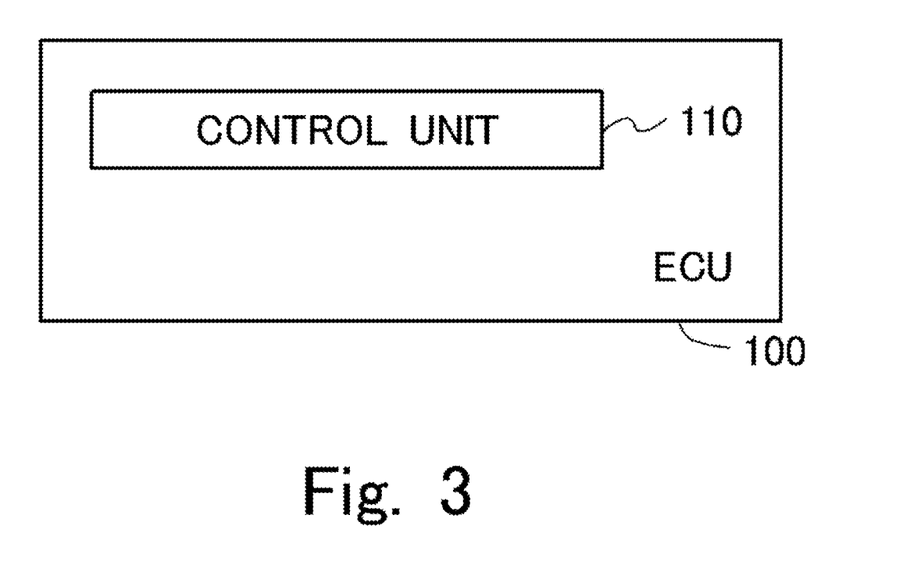
FIG. 3 is a diagram illustrating an example of functional components of an ECU according to the embodiment.

Next, functional components of the ECU 100 will be described. FIG. 3 is a diagram illustrating an example of functional components of the ECU 100 according to the embodiment. The ECU 100 includes a control unit 110 as a functional component. The processor 101 of the ECU 100 executes the processing of the control unit 110 by means of a computer program on the main storage unit 102. However, any of the individual functional components or a part of the processing thereof may be implemented by a hardware circuit.

When receiving an air conditioning command transmitted from the server 30, the control unit 110 operates the engine 41, the heat pump 51 or the like, based on the air conditioning command. Thus, remote air conditioning of the vehicle 10 is started. Here, the air conditioning command is a command for operating the air conditioner 50 in the vehicle by remote control. The remote air conditioning is to operate the air conditioner 50 by remote control to adjust the environment inside the vehicle when the user is not in the vehicle 10.

When heating is performed in the remote air conditioning, either a first air conditioning mode in which air conditioning is performed by operating the engine 41, or a second air conditioning mode in which the heat pump 51 is operated by supplying electric power from the battery 42 to the heat pump 51 for air conditioning, is executed. The first air conditioning mode is performed when the outside air temperature is, for example, −10 degrees C. or lower, whereas the second air conditioning mode is performed when the outside air temperature is, for example, higher than −10 degrees C.

Here, the control unit 110 executes the second air conditioning mode regardless of the vehicle exterior temperature when the remote air conditioning is started. After that, based on the detected value of the exterior temperature sensor 44, the control unit 110 determines which of the first air conditioning mode and the second air conditioning mode is to be executed, and when this determination is to execute the first air conditioning mode, it switches the air conditioning from the second air conditioning mode to the first air conditioning mode.

If it is determined which of the first air conditioning mode and the second air conditioning mode is to be executed based on the outside air temperature at the start of the remote air conditioning, the air conditioning is executed through a process of obtaining the detected value of the exterior temperature sensor 44 and a process of selecting an air conditioning mode based on the temperature thus obtained. At this time, it takes, for example, several seconds to select the air conditioning mode. For example, in cases where the user terminal 20 is notified of the start of remote air conditioning, the notification will be delayed by the time for which the air conditioning mode is selected in the vehicle 10. Therefore, the user is made to wait, which is inconvenient for the user.

On the other hand, at the start of the remote air conditioning, the remote air conditioning can be started without obtaining the detected value of the external temperature sensor 44 by first executing the second air conditioning mode. Therefore, the waiting time of the user is shortened. In addition, if the second air conditioning mode is executed when the outside air temperature is −10 degrees C. or lower, for example, there is a concern that the temperature inside the vehicle cannot be raised sufficiently due to insufficient heating capacity. However, since the air conditioning mode is immediately switched based on the value detected by the external temperature sensor 44, the delay in the rise of the vehicle interior temperature is small. In addition, when the remote air conditioning is executed, it is considered that there is a certain amount of time until the user gets in the vehicle. Compared to the delay until the air conditioning mode is switched, the time until the user gets in the vehicle is sufficiently long, and hence, even if the remote air conditioning in the first air conditioning mode is started at −10 degrees C. or less, it will be immediately switched to the second air conditioning mode, so that the influence of the delay in temperature rise during the first air conditioning mode is small.

Figure 4:
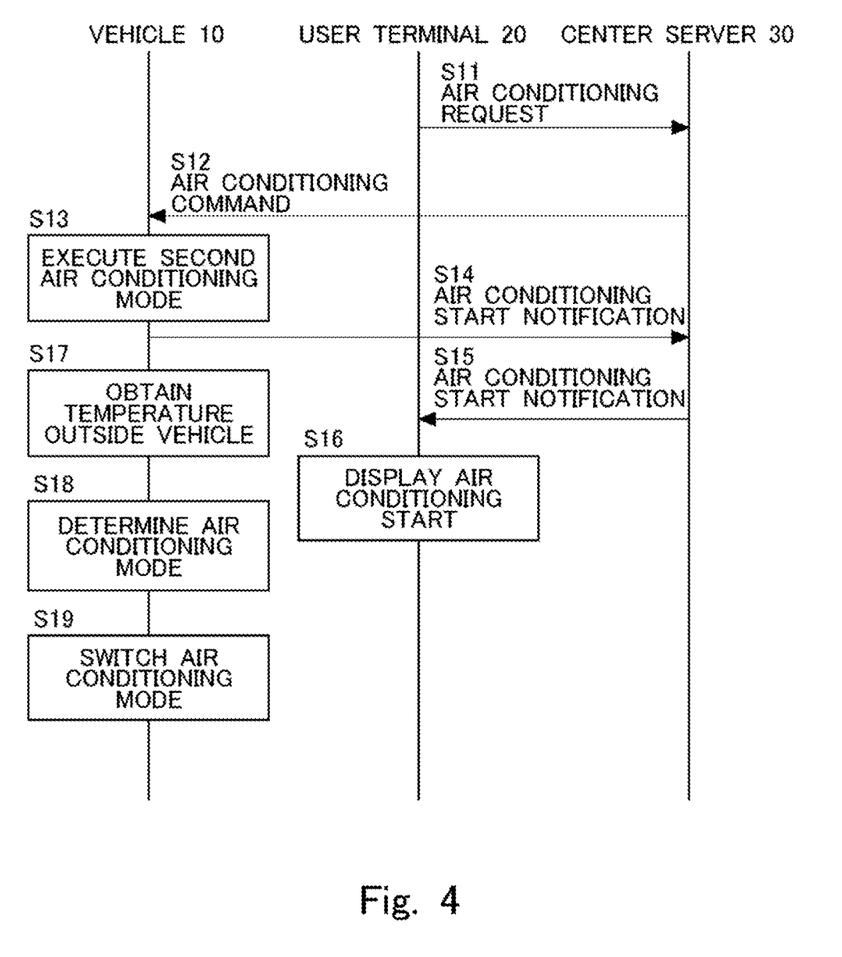
FIG. 4 is a sequence diagram illustrating the processing of the system as a whole according to the first embodiment.

Now, the processing of the system 1 as a whole will be described. FIG. 4 is a sequence diagram illustrating the processing of the system 1 as a whole according to the first embodiment. The vehicle 10 and the user terminal 20 illustrated in FIG. 4 have been associated with each other in advance and registered in the server 30. In the user terminal 20, when the user activates predetermined application software to perform an operation for starting remote air conditioning, an air conditioning request is generated in the user terminal 20 and transmitted to the server 30 (S11). Upon receiving the air conditioning request, the server 30 generates an air conditioning command, which is a command for executing remote air conditioning, for the corresponding vehicle 10, and transmits it to the vehicle 10 (S12).

The control unit 110 of the vehicle 10, which has received the air conditioning command, executes the second air conditioning mode (S13). As a result, the remote air conditioning can be started immediately. When the second air conditioning mode is executed, an air conditioning start notification is transmitted from the vehicle 10 to the server 30 (S14). The air conditioning start notification is a notification for notifying the user that the remote air conditioning has started. The server 30 transmits the air conditioning start notification to the user terminal 20 (S15). In the user terminal 20 that has received the air conditioning start notification, an image indicating that the remote air conditioning has started is displayed on the display 205. Thus, the user can know that the remote air conditioning has been started.

In addition, the control unit 110 of the vehicle 10 obtains the vehicle exterior temperature after transmitting the air conditioning start notification (S17). Further, the control unit 110 of the vehicle 10 determines the air conditioning mode based on the vehicle exterior temperature (S18). That is, the air conditioning mode corresponding to the vehicle exterior temperature is determined. Then, in cases where the air conditioning mode corresponding to vehicle exterior temperature is the first air conditioning mode, the control unit 110 of the vehicle 10 switches it to the first air conditioning mode (S19). On the other hand, in cases where the air conditioning mode corresponding to the vehicle exterior temperature is the second air conditioning mode, the second air conditioning mode is continuously executed. The remote air conditioning is stopped when a predetermined stop condition is established.

Figure 5:
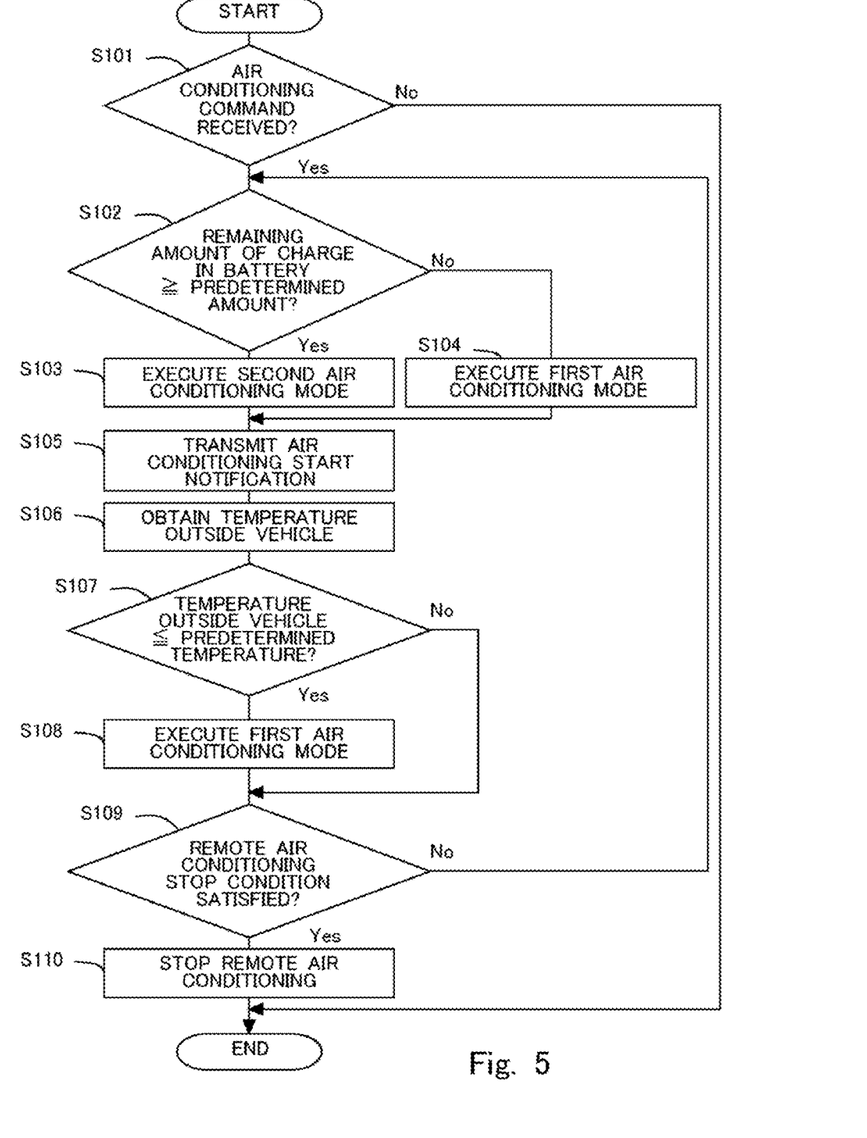
FIG. 5 is a flowchart of the processing of remote air conditioning in the vehicle according to the first embodiment.

Next, processing of the remote air conditioning in the vehicle 10 will be described. FIG. 5 is a flowchart of the processing of the remote air conditioning in the vehicle 10 according to the first embodiment. The processing or routine illustrated in FIG. 5 is executed in the ECU 100 at each predetermined time.

In step S101, the control unit 110 determines whether or not an air conditioning command has been received from the server 30. The air conditioning command may include information on a target temperature. When an affirmative determination is made in step S101, the processing or routine proceeds to step S102, whereas when a negative determination is made, this routine is ended. In step S102, the control unit 110 determines whether or not the remaining amount of charge in the battery 42 is equal to or greater than a predetermined amount. In this step S102, it is determined whether or not a condition for performing air conditioning in the second air conditioning mode is satisfied. The predetermined amount is a remaining amount of charge in which the influence on the traveling of the vehicle 10 is within an allowable range even when the remote air conditioning is executed in the second air conditioning mode. That is, in the case where the remaining amount of charge is less than the predetermined amount, executing the remote air conditioning in the second air conditioning mode may cause the remaining amount of charge in the battery 42 to become insufficient after that, which may affect the traveling of the vehicle 10. In such a case, the air conditioning in the second air conditioning mode is not executed. The predetermined amount has been stored in the auxiliary storage unit 103. In addition, the remaining amount of charge is obtained based on, for example, the voltage of the battery 42 or the like. When an affirmative determination is made in step S102, the processing proceeds to step S103, whereas when a negative determination is made, the processing proceeds to step S104.

In step S103, the control unit 110 executes the second air conditioning mode. When the remote air conditioning is not started, air conditioning is started by operating the heat pump 51. When the remote air conditioning has been started and the air conditioning in the second air conditioning mode has already been performed, the second air conditioning mode is continued. At this time, the remaining amount of charge in the battery 42 is sufficiently large, and hence, the remote air conditioning can be quickly started by starting the air conditioning by means of the heat pump 51. On the other hand, in step S104, the control unit 110 executes the first air conditioning mode. When the air conditioning in the second air conditioning mode has already been performed, the second air conditioning mode is switched to the first air conditioning mode to perform the air conditioning. In this step S104, the engine 41 is started to circulate the cooling water, and air conditioning is started using the heat of the cooling water. At this time, there is a concern that the remaining amount of charge in the battery 42 may be insufficient, so a decrease in the remaining amount of charge in the battery 42 is suppressed by performing the air conditioning using the heat generated in the engine 41 while suppressing the power consumption of the battery 42. In addition, the remaining amount of charge in the battery 42 can be increased by starting the engine 41. Note that a well-known technique can be used for the control when air conditioning is performed in the first air conditioning mode and the second air conditioning mode. In this case, for example, the control is performed such that the vehicle interior temperature approaches the target temperature. Note that the processing of step S102 and the processing of step S104 may be omitted.

In step S105, the control unit 110 transmits an air conditioning start notification to the server 30. The air conditioning start notification includes information indicating that air conditioning has been started and a vehicle ID that is information for identifying the vehicle 10. Note that the air conditioning start notification may further include information capable of determining which one of the first air conditioning mode and the second air conditioning mode is being executed. In step S106, the control unit 110 obtains the vehicle exterior temperature. The control unit 110 obtains the vehicle exterior temperature by reading the detected value of the external temperature sensor 44.

In step S107, the control unit 110 determines whether or not the vehicle exterior temperature is equal to or less than a predetermined temperature. The predetermined temperature is a temperature that serves as a boundary when it is determined which of the first air conditioning mode and the second air conditioning mode is to be executed. This temperature may be set, for example, in accordance with the capacity or performance of the heat pump 51, or may be set based on laws and regulations. For example, there may be a case where even if the second air conditioning mode is executed, the vehicle interior temperature cannot be made sufficiently high due to the insufficient capacity or performance of the heat pump 51. In such a case, the predetermined temperature is set so as to execute the first air conditioning mode. In addition, for example, there may be a case where there is a regulation in which the first air conditioning mode cannot be executed unless the vehicle exterior temperature is equal to or less than the predetermined temperature. In such a case, the first air conditioning mode may be set only when the vehicle exterior temperature is equal to or less than the predetermined temperature. However, the first air conditioning mode may be executed when the remaining amount of charge in the battery 42 is less than the predetermined amount so that the first air conditioning mode is executed in step S104. The predetermined temperature has been stored in the auxiliary storage unit 103. When an affirmative determination is made in step S107, the processing proceeds to step S108, whereas when a negative determination is made, the processing proceeds to step S109. When the negative determination is made in step S107, the air conditioning mode executed in step S103 or step S104 is continued.

In step S108, the control unit 110 executes the first air conditioning mode. In cases where the second air conditioning mode has been executed in step S103, the second air conditioning mode is switched to the first air conditioning mode. Also, in cases where the first air conditioning mode has been executed in step S104, the first air conditioning mode is continued.

In step S109, the control unit 110 determines whether or not a condition for stopping the remote air conditioning is satisfied. The condition for stopping the remote air conditioning is satisfied, for example, when the user gets in the vehicle 10 and starts the vehicle 10. In this case, for example, when it is detected that a door of the vehicle 10 is opened, it may be determined that the condition for stopping the remote air conditioning is satisfied. In addition, the remote air conditioning is stopped when an operation related to the traveling of the vehicle 10, such as stepping on an accelerator pedal or operating a steering wheel, is performed. Otherwise, when the remaining amount of fuel in the engine 41 becomes equal to or less than a predetermined amount while the first air conditioning mode is being executed, it may be determined that the stop condition for the remote air conditioning is established. The predetermined amount referred to herein is a fuel amount that may make it difficult to operate the engine 41. When an affirmative determination is made in step S109, the processing proceeds to step S110, whereas when a negative determination is made, the processing returns to step S102. In step S110, the control unit 110 stops the remote air conditioning. At this time, the control unit 110 may notify the server 30 that the remote air conditioning has been stopped.

As described above, according to the present embodiment, when remote air conditioning is started, it is possible to immediately start the remote air conditioning regardless of the vehicle exterior temperature, so that a notification of starting the remote air conditioning can be quickly transmitted to the user terminal 20. Therefore, the waiting time of the user can be reduced.

Second Embodiment

Figure 6:
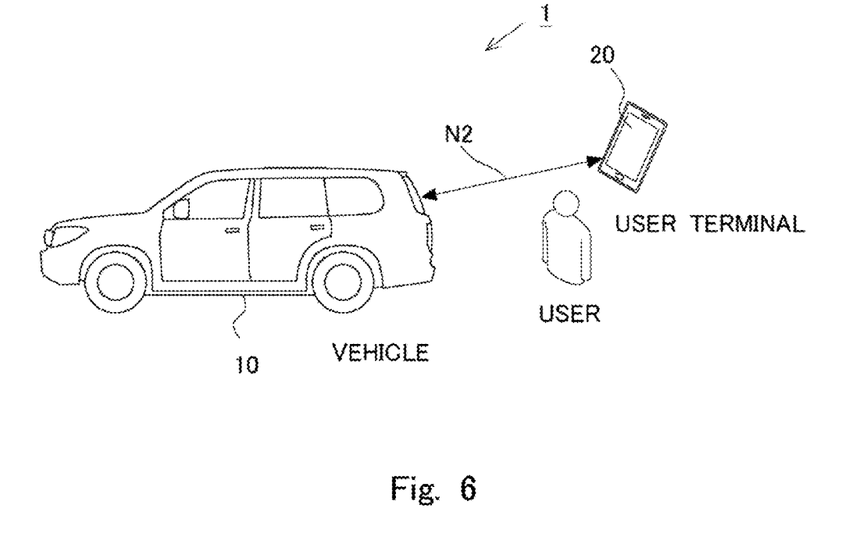
FIG. 6 is a view illustrating a schematic configuration of a system according to a second embodiment.

FIG. 6 is a view illustrating a schematic configuration of a system 1 according to a second embodiment. In the above-mentioned first embodiment, an air conditioning request is transmitted from the user terminal 20 to the server 30 via the network N1, but in the second embodiment, an air conditioning request is transmitted directly from the user terminal 20 to the vehicle 10 via the network N2. Since the hardware configuration of the second embodiment has the same configuration as that illustrated in FIG. 2, the description thereof will be omitted.

Figure 7:
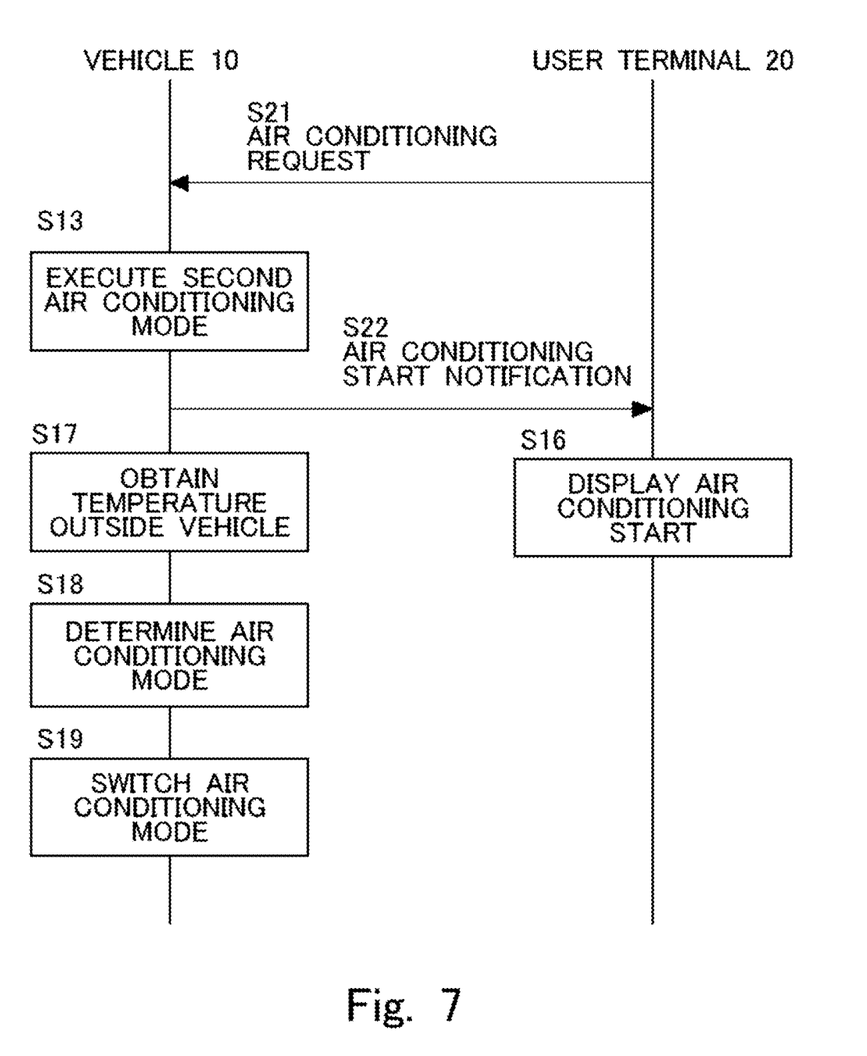
FIG. 7 is a sequence diagram illustrating the processing of the system as a whole according to the second embodiment.

Now, the processing of the entire system 1 will be described. FIG. 7 is a sequence diagram illustrating the processing of the system 1 as a whole according to the second embodiment. Those steps in which the same processing is performed as in the sequence diagram illustrated in FIG. 4 are denoted by the same reference signs, and the description thereof will be omitted. When the user activates predetermined application software in the user terminal 20 and performs an operation for starting remote air conditioning, an air conditioning request is generated in the user terminal 20 and transmitted to the vehicle 10 (S21). When the control unit 110 of the vehicle 10 selects the second air conditioning mode to start air conditioning, an air conditioning start notification is transmitted from the vehicle 10 to the user terminal 20 (S22). Thus, the user can know that the remote air conditioning has been started.

Regarding the processing in the vehicle 10, the server 30 can be replaced with the user terminal 20 in the processing illustrated in FIG. 5, and thus the description thereof will be omitted.

In this way, even in cases where the vehicle 10 and the user terminal 20 directly communicate with each other to perform remote air conditioning, it is possible to shorten the time required for transmitting the air conditioning start notification from the vehicle 10 to the user terminal 20, as a result of which the waiting time of the user can be shortened.

Other Embodiments

The above-described embodiments are merely examples, but the present disclosure can be implemented with appropriate modifications without departing from the spirit thereof.

The processing and/or means (devices, units, etc.) described in the present disclosure can be freely combined and implemented as long as no technical contradiction occurs.

The processing described as being performed by one device or unit may be shared and performed by a plurality of devices or units. Alternatively, the processing described as being performed by different devices or units may be performed by a single device or unit. In a computer system, it is possible to flexibly change the hardware configuration (server configuration) that can achieve each function of the computer system.

The present disclosure can also be realized by supplying to a computer a computer program in which the functions described in the above-described embodiments are implemented, and reading out and executing the program by means of one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read only memory (ROM), a random access memory (RAM), an EPROM, an EEPROM, a magnetic card, a flash memory, an optical card, or any type of medium suitable for storing electronic commands or instructions.

What is claimed is:

1. An information processing apparatus configured to perform remote air conditioning by selecting either one of a first air conditioning mode, which is a mode in which remote air conditioning is performed using an engine of a vehicle, and a second air conditioning mode, which is a mode in which remote air conditioning is performed using electric power stored in a battery of the vehicle, the information processing apparatus comprising a controller configured to:
  determine, before selecting the second air conditioning mode to start air conditioning, whether or not a condition for performing air conditioning in the second air conditioning mode is satisfied, in response to obtaining a request for performing the remote air conditioning transmitted from a terminal of a user;
  select the second air conditioning mode to start the air conditioning by operating a heat pump included in the vehicle in response to determining that the condition is satisfied; and
  switch from the second air conditioning mode to the first air conditioning mode based on a temperature outside the vehicle, in response to selecting the second air conditioning mode to start the air conditioning; wherein
  determine whether or not a remaining amount of charge in the battery is equal to or greater than a predetermined amount; and
  determine that the condition is satisfied, in response to determining that the remaining amount of charge in the battery is equal to or greater than the predetermined amount.

2. The information processing apparatus according to claim 1, wherein the controller is configured to output information indicating that the air conditioning is started, in response to selecting the second air conditioning mode to start the air conditioning.

3. The information processing apparatus according to claim 1, wherein the controller obtains information on the temperature outside the vehicle from a temperature sensor attached to the vehicle.

4. The information processing apparatus according to claim 1, wherein when switching from the second air conditioning mode to the first air conditioning mode based on the temperature outside the vehicle, in response to selecting the second air conditioning mode to start the air conditioning, the controller executes:
  obtaining information on a temperature outside the vehicle;
  determining whether or not the temperature outside the vehicle is equal to or lower than a predetermined temperature;
  selecting the first air conditioning mode, in response to determining that the temperature outside the vehicle is equal to or lower than the predetermined temperature; and
  switching from the second air conditioning mode to the first air conditioning mode, in response to selecting the first air conditioning mode.

5. The information processing apparatus according to claim 1, wherein the controller executes:
  when determining whether or not the remaining amount of charge in the battery is equal to or greater than the predetermined amount,
  determining that the condition is not satisfied, in response to determining that the remaining amount of charge in the battery is less than the predetermined amount; and
  selecting, in response to determining that the condition is not satisfied, the first air conditioning mode to start the air conditioning, even when the air conditioning is started in response to obtaining the request for performing the remote air conditioning.

6. The information processing apparatus according to claim 1,
  wherein in response to selecting the second air conditioning mode to start the air conditioning, the controller executes:
  determining whether or not the remaining amount of charge in the battery is less than the predetermined amount; and
  switching from the second air conditioning mode to the first air conditioning mode to perform the air conditioning, in response to determining that the remaining amount of charge in the battery is less than the predetermined amount.

7. An information processing method configured to perform remote air conditioning by selecting either one of a first air conditioning mode, which is a mode in which remote air conditioning is performed using an engine of a vehicle, and a second air conditioning mode, which is a mode in which remote air conditioning is performed using electric power stored in a battery of the vehicle, wherein
  a computer executes:
    determining, before selecting the second air conditioning mode to start air conditioning, whether or not a condition for performing air conditioning in the second air conditioning mode is satisfied, in response to obtaining a request for performing the remote air conditioning transmitted from a terminal of a user;
    selecting the second air conditioning mode to start the air conditioning by operating a heat pump included in the vehicle in response to determining that the condition is satisfied; and
    switching from the second air conditioning mode to the first air conditioning mode based on a temperature outside the vehicle, in response to selecting the second air conditioning mode to start the air conditioning; wherein
    determining whether or not a remaining amount of charge in the battery is equal to or greater than a predetermined amount; and
    determining that the condition is satisfied, in response to determining that the remaining amount of charge in the battery is equal to or greater than the predetermined amount.

8. The information processing method according to claim 7, wherein
the computer outputs information indicating that the air conditioning has been started, in response to selecting the second air conditioning mode to start the air conditioning.

9. The information processing method according to claim 7, wherein
the computer obtains information on the temperature outside the vehicle from a temperature sensor attached to the vehicle.

10. The information processing method according to claim 7, wherein
when switching from the second air conditioning mode to the first air conditioning mode based on the temperature outside the vehicle, in response to selecting the second air conditioning mode to start the air conditioning, the computer executes:
obtaining information on a temperature outside the vehicle;
determining whether or not the temperature outside the vehicle is equal to or lower than a predetermined temperature;
selecting the first air conditioning mode in response to determining that the temperature outside the vehicle is equal to or lower than the predetermined temperature; and
switching from the second air conditioning mode to the first air conditioning mode in response to selecting the first air conditioning mode.

11. The information processing method according to claim 7, wherein
the computer executes:
when determining whether or not the remaining amount of charge in the battery is equal to or greater than the predetermined amount,
determining that the condition is not satisfied, in response to determining that the remaining amount of charge in the battery is less than the predetermined amount; and
selecting, in response to determining that the condition is not satisfied, the first air conditioning mode to start the air conditioning, even when the air conditioning is started in response to obtaining the request for performing the remote air conditioning.

12. A vehicle comprising:
an engine;
a battery;
a temperature sensor configured to detect a temperature outside the vehicle; and
a controller configured to perform remote air conditioning by selecting either one of a first air conditioning mode, which is a mode in which remote air conditioning is performed using the engine, and a second air conditioning mode, which is a mode in which remote air conditioning is performed using electric power stored in the battery; wherein
the controller is configured to:
determine, before selecting the second air conditioning mode to start air conditioning, whether or not a condition for performing air conditioning in the second air conditioning mode is satisfied, in response to obtaining a request for performing the remote air conditioning transmitted from a terminal of a user;
select the second air conditioning mode to start the air conditioning by operating a heat pump included in the vehicle in response to determining that the condition is satisfied; and
switch from the second air conditioning mode to the first air conditioning mode based on the temperature outside the vehicle, in response to selecting the second air conditioning mode to start the air conditioning; wherein
determine whether or not a remaining amount of charge in the battery is equal to or greater than a predetermined amount; and
determine that the condition is satisfied, in response to determining that the remaining amount of charge in the battery is equal to or greater than the predetermined amount.

13. The vehicle according to claim 12, wherein
the controller outputs information indicating that the air conditioning is started, in response to selecting the second air conditioning mode to start the air conditioning.

* * * * *